United States Patent [19]

Zierhut

[11] Patent Number: 5,801,583
[45] Date of Patent: Sep. 1, 1998

[54] COILLESS BUS COUPLER FOR AN ON-BOARD POWER SUPPLY

[75] Inventor: Hermann Zierhut, Neutraubling, Germany

[73] Assignee: Siemens Aktiengesellschaft, München, Germany

[21] Appl. No.: 776,139

[22] PCT Filed: Jun. 30, 1995

[86] PCT No.: PCT/DE95/00854

§ 371 Date: Jul. 25, 1997

§ 102(e) Date: Jul. 25, 1997

[87] PCT Pub. No.: WO96/02982

PCT Pub. Date: Feb. 1, 1996

[30] Foreign Application Priority Data

Jun. 30, 1995 [DE] Germany ............... 44 24 907.1

[51] Int. Cl.[6] ............................................. H04B 3/54
[52] U.S. Cl. ............................................. 327/540; 327/538
[58] Field of Search ............................. 327/540, 542, 327/541, 538, 58–60, 61, 72, 73, 87, 88, 89; 323/313, 314

[56] References Cited

U.S. PATENT DOCUMENTS 5,546,419  8/1996  Zierhut .................. 375/257

FOREIGN PATENT DOCUMENTS

| 0 365 696 | 5/1990 | European Pat. Off. . |
| 0 379 902 | 8/1990 | European Pat. Off. . |
| 4200022 | 11/1990 | Japan . |
| 93/08652 | 4/1993 | WIPO . |

*Primary Examiner*—Timothy P. Callahan
*Assistant Examiner*—T. T. Lam
*Attorney, Agent, or Firm*—Kenyon & Kenyon

[57] ABSTRACT

A device for supplying the on-board system voltage in a bus coupler without a repeater, for coupling to an information and power carrying bus of a bus system, in particular for building systems management. The device includes a coupling circuit having a control input connected to a triggering circuit having inputs for a control criterion. The coupling circuit operates as a constant current source at communications frequencies and as a control circuit together with a triggering circuit at lower frequencies, such as those caused by power consumption. The coupling circuit is effectively connected in series with a reservoir capacitor for tapping the on-board system voltage. The series connection is effectively connected to the bus drivers.

6 Claims, 5 Drawing Sheets

COILLESS BUS COUPLER FOR AN ON-BOARD POWER SUPPLY

FIELD OF THE INVENTION

The present invention relates to a device for providing the on-board power supply in a bus coupler without a repeater for coupling to an information and power conducting bus of a bus system, in particular for building systems management.

BACKGROUND INFORMATION

Published International Patent Application No. WO-A 9,308,652 describes a bus coupler for coupling to an information and power carrying bus (bus drivers 1, 2) of a bus system. Such a coupler is based on the principle of reducing reflection on a line that is not closed. The bus coupler described therein works without a repeater.

There are bus systems in use in building systems management, for example, the bus system of the European Installation Bus Association, EIBA, where reflection on the open line is negligible due to its mode of operation.

In the past, bus couplers have been designed with repeaters (see, e.g., European Patents Nos. A 365,696 and A 379,902). The DC voltage for the on-board power supply is obtained from the bus with a repeater and a capacitor that function as an LC filter. With a low-resistance DC resistor of the inductance of the repeater, a low resistance is used for obtaining the DC current and a high-resistance inductive resistor is used for the AC load due to the information transmission. In such a design, there are limits to the miniaturization and integration into an integrated circuit (IC).

SUMMARY OF THE INVENTION

An object of the present invention is to provide a device for supplying the on-board system voltage in a bus coupler, without a repeater, for coupling to a bus that carries both information and power, where it is irrelevant whether or not measures are to be taken to reduce reflection.

In accordance with the present invention, a coupling circuit with a control input is connected to a triggering circuit via the control input, where the triggering circuit has inputs for a control criterion. The coupling circuit is designed and constructed so that it operates as a constant current source for the communications frequencies and as a control circuit in combination with the triggering circuit for lower frequencies. Such lower frequencies are caused by power consumption. The communications frequencies can be understood as the transmission speed in bits/second. Thus, for example, the bus of the European Installation Bus Association, i.e., the EIBA bus, operates at 9.6 kbit/sec, which corresponds to a frequency of 9.6 kHz. The coupling circuit is effectively connected in series with a capacitor for tapping the on-board voltage. The series connection is effectively connected to the bus drivers.

Since the highest control frequency is set lower than the lowest transmission frequency, it is ensured that the resistance of the coupling circuit is low enough for the on-board power supply and is high enough for communications signals. Therefore, communications on the bus are not attenuated by the on-board power supply. On the other hand, the power for the on-board power supply is obtained in an especially economical and low-loss manner. In practice, it is advantageous to set the highest control frequency lower than one-tenth of the lowest transmission frequency.

Such a design permits implementation in an integrated circuit (IC).

The coupling circuit may effectively have a transistor whose emitter across a resistor forms one terminal of the coupler circuit to which a capacitor is also connected and on the other side is connected to the base of the transistor that serves as a control input and whose collector in turn forms the other terminal of the coupling circuit. Such a design is especially simple and effective.

The triggering circuit is preferably connected at its inputs to the two terminals of the coupling circuit and is designed and wired so as to minimize the voltage drop of the coupling circuit. This permits control with minimal voltage drop at the coupling circuit and thus yields the highest possible efficiency.

The triggering circuit can be optimized in various regards. If the control system is to achieve a constant on-board voltage instead of the highest possible efficiency, a triggering circuit can be used whose inputs are connected to the capacitor and which is wired and designed so that the voltage tapped from the capacitor as the on-board voltage is kept constant.

On the other hand, the triggering circuit can be designed for control to minimize current consumption from the bus system and thus reduce the power consumption of the bus system. Then the triggering circuit is wired at the inputs into the current path for the on-board power supply. It is wired and designed so that the coupling circuit draws current from the bus only as needed for the on-board power supply.

With a further embodiment of the device of the present invention, it is possible to obtain the on-board voltage on the order of the average bus voltage, which is higher than the lowest bus voltage. This might be explained as the communications being superimposed as an AC voltage on a DC potential in a power and information carrying bus, so the lowest bus voltage drops to the extent of the negative information content with regard to the DC voltage potential. A bypass circuit in accordance with the present invention makes it possible for a current to be diverted through the bypass in the operating phase of the constant current source even when the on-board voltage is greater than the bus voltage at certain times of operation, so the constant current source can still be operated properly.

In such a device, a bypass circuit is provided in series with the coupling circuit and in bridging the reservoir capacitor, where a directional blocking valve is wired in series with the capacitor in the bridged branch. This directional blocking valve is operated so that when the voltage at the reservoir capacitor is greater than the voltage at the bypass circuit, the valve is in its blocking status. A directional locking valve is understood to refer to a valve that blocks in one direction and allows current to pass through it in the other direction. Such a valve may be a directional self-locking valve, or it may be controlled in an open or closed loop control system.

The directional blocking valve of the present invention is in its conducting state when the voltage at the reservoir capacitor is lower than the voltage on the bypass circuit. The bypass is wired or designed so that it blocks when the bus voltage is greater than the on-board voltage tapped from the reservoir capacitor and it conducts when the bus voltage is lower than the on-board voltage tapped from the reservoir capacitor. Proper functioning in the constant current source phase of operation is thus achieved by a directional blocking valve and a bypass circuit even when the on-board voltage tapped is on the order of the average bus voltage, which is higher than the lowest bus voltage.

The bypass circuit can be designed with a comparator in a known way. However, such a comparator is rendered superfluous in an especially simple and economical manner by a bypass circuit in accordance with the present invention. Such a bypass circuit has a transistor whose base is connected to the control line between the triggering circuit and the coupling circuit. An element that produces a voltage drop, in particular a diode in the conducting direction, is wired between the base of the transistor of the coupling circuit and the base of the transistor of the bypass. A DC transformation is replaced here by a voltage drop at the element that produces the voltage drop.

A comparator in the bypass circuit is also unnecessary in an embodiment of the present invention in which the transistor of the coupling circuit has a sensing collector (see, e.g., German Patent No. A 4,316,608) connected to a transistor of a complementary type that forms the bypass circuit. This makes a comparator superfluous in an especially advantageous design that saves on silicon usage when integrated into a chip.

DETAILED DESCRIPTION

Figure 1:
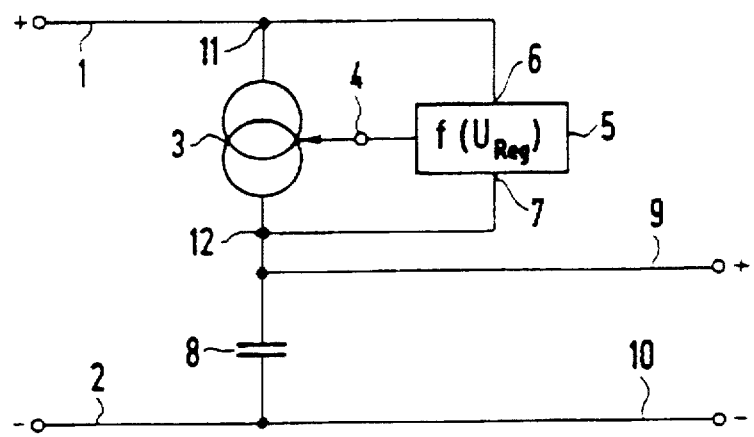
FIG. 1 shows a schematic diagram of a device for supplying on-board system voltage, where the control criterion in control operation is the voltage drop at the constant current source. The system is controlled for a minimum voltage drop at the coupling circuit to achieve the highest possible efficiency.

FIG. 1 shows a device for supplying the on-board system voltage in a bus coupler without a repeater. The device is connected to a bus with bus drivers 1 and 2. For example, the upper bus carries a positive potential and the lower bus carries a negative potential or ground. The device includes a coupling circuit 3 that is connected at its control input 4 to a triggering circuit 5. Triggering circuit 5 has inputs 6 and 7 for a control criterion. Coupling circuit 3 is designed and constructed to be operated at the frequencies used for communications when functioning as a constant current source. The communications frequencies are transmitted as AC signals superimposed on a DC potential of the bus. For low frequencies, coupling circuit 3 operates as a control circuit in combination with triggering circuit 5. Coupling circuit 3 is thus effectively connected to a reservoir capacitor 8 where the on-board system voltage can be tapped as a DC voltage at power supply rails 9 and 10. The series connection of coupling circuit 3 and reservoir capacitor 8 is thus effectively connected to bus drivers 1 and 2. The on-board system voltage can be supplied to a bus coupler via power supply rails 9 and 10. The device for supplying the on-board system voltage may be part of the bus coupler. The power for the on-board power supply can be obtained in an especially economical and low-loss manner.

Figure 5:
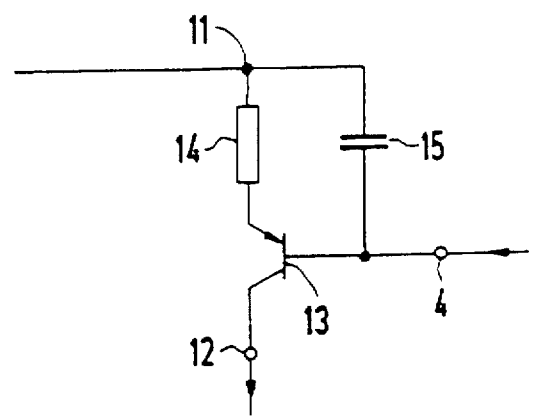
FIG. 5 shows an embodiment of the coupling circuit according to FIGS. 1 to 4.

The coupling circuit may be designed especially simply and efficiently as illustrated in FIG. 5, where the coupling circuit has at least a transistor 13 whose emitter forms a terminal 11 of the coupling circuit across a resistor 14. A capacitor 15 is connected on one side to terminal 11 and on the other side to the base of transistor 13 which base serves as the control input 4. The collector of transistor 13 forms a third terminal 12 of the coupling circuit. When the current is high, resistor 14 can be so small that the internal emitter resistance of the transistor is sufficient and therefore an additional external resistor is unnecessary, so that resistor 14 can be omitted.

Figure 6:
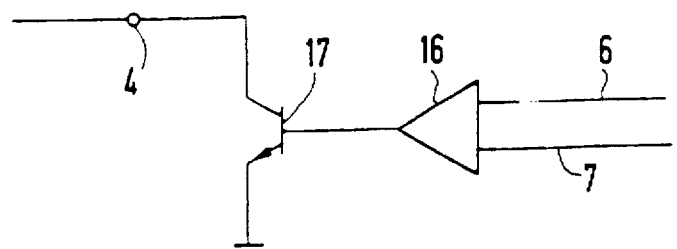
FIG. 6 shows an embodiment of a triggering circuit for the device according to FIG. 1 or FIG. 2.

The triggering circuit 5, which is connected to both terminals 11 and 12 of the coupling circuit 3, may be implemented in accordance with FIG. 6. Inputs 6 and 7 of the triggering circuit for a control criterion lead to a comparator 16 whose output is connected to the base of a transistor 17 of the triggering circuit. For example, the collector of the transistor 17 is coupled to the control input 4 of the coupling circuit. The emitter of the transistor 17 is connected to ground, for example.

The time constant of the coupling circuit 3 according to FIG. 5 is obtained as the product of the gain B of the transistor 13, the resistance of resistor 14 and the capacitance of the capacitor 15, i.e., as $\tau = B \times R \times C$. The coupling circuit acts as a constant current source with the time constant $\tau$ at high frequencies such as those used for communications.

The other terminal 12 of the coupling circuit forms the output of the constant current source while terminal 11 forms the input.

Figure 2:
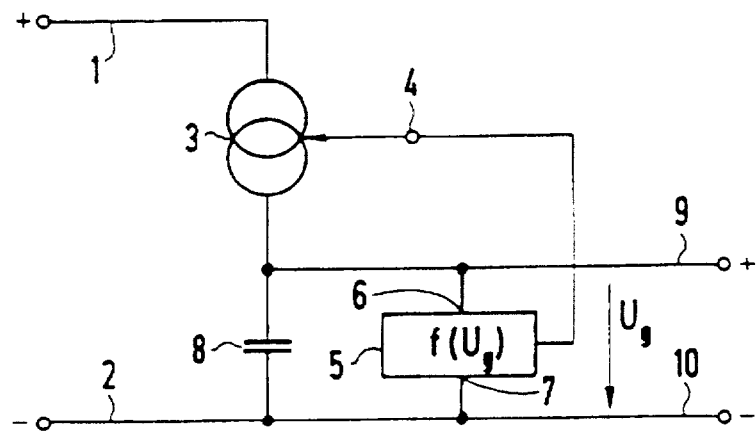
FIG. 2 shows a device where the system is controlled for a constant on-board system voltage or operating voltage of the bus coupler in control operation.

In the embodiment of FIG. 2, where the control criterion is the on-board system voltage or the operating voltage at reservoir capacitor 8, the coupling circuit 3 and the triggering circuit 5 may be designed as in the embodiments according to FIGS. 5 and 6.

Figure 3:
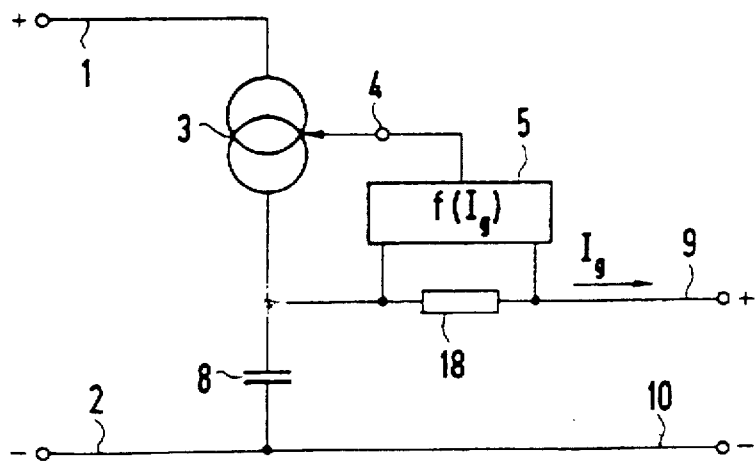
FIG. 3 shows a device where the system is controlled for minimum current and power consumption from the bus system in control operation.

In a further embodiment, shown in FIG. 3, where the control criterion is the on-board system current or the operating current, coupling circuit 3 and triggering circuit 5 may be designed as shown in FIGS. 5 and 6 according to the principles described here. Inputs 6 and 7 of the triggering circuit can be coupled to opposite sides of a measuring resistor 18, where the on-board system current through the measuring resistor 18 is converted as an input voltage for the triggering circuit.

Figure 4:
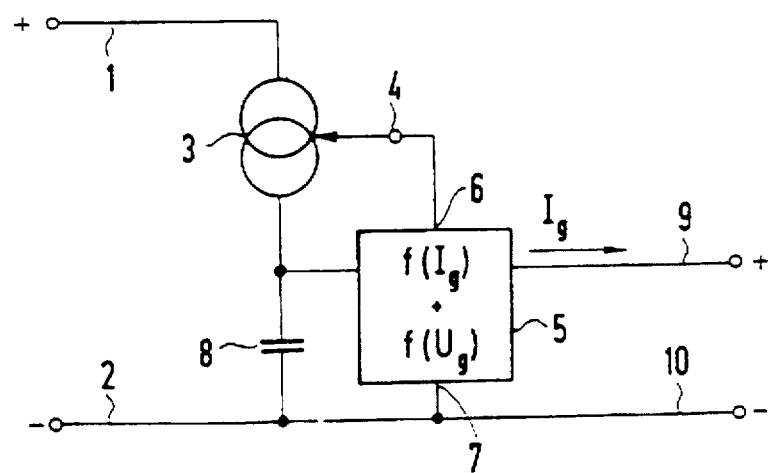
FIG. 4 shows a device that works as a combination of a device according to FIG. 2 and a device according to FIG. 3.

An embodiment according to FIG. 4 can be understood as a combination of the principles according to FIGS. 2 and 3.

Figure 7:
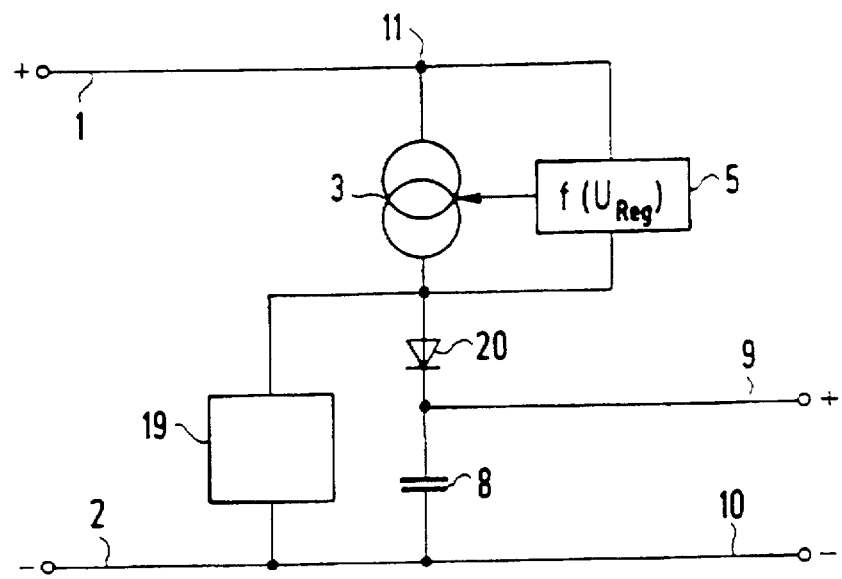
FIG. 7 shows an improvement with a bypass to the device according to FIG. 1.

With the device according to FIG. 7, a bypass circuit 19 and a directional blocking valve 20 are provided in a device according to FIG. 1. Of course, specific components according to the embodiments can be implemented effectively in an integrated circuit. All of the circuits according to the FIGS. illustrated here are to be understood in this sense.

The bypass circuit 19 is provided in series with the coupling circuit 3 in bridging reservoir capacitor 8. A directional blocking valve 20 is wired into the bridged branch in series with the reservoir capacitor 8 so that the directional blocking valve 20 is in its blocking state when the voltage at reservoir capacitor 8 is higher than the voltage at the bypass circuit 19. However, when the voltage at the reservoir capacitor 8 is lower than the voltage at the bypass circuit 19, the directional blocking valve 20 is in its conducting state. The bypass circuit 19 is designed and wired so that it is in a blocking state when the bus voltage between the bus drivers 1 and 2 is higher than the on-board system voltage tapped from the reservoir capacitor 8. When the bus voltage is lower than the on-board system voltage tapped from the reservoir capacitor 8, the bypass circuit is conducting. The coupling circuit 3, which is then operated as a constant current source, can conduct the current over the bypass circuit and maintain its function as a constant current source.

The directional blocking valve may be designed as a directionally self-blocking valve or it may be controlled by an open or closed loop.

In the circuit of FIG. 7, when the coupling circuit 3 is operated as a constant current source, the current is carried as a charging current to reservoir capacitor 8 via the directional blocking valve 20 when the bus voltage is higher than the voltage at the capacitor. If due to the superimposed communication the bus voltage drops below the voltage on the reservoir capacitor 8, the reservoir capacitor is prevented from discharging across the directional valve 20 and the current of the constant current source is carried over the bypass circuit 19. During other operating phases, coupling circuit 3 in combination with triggering circuit 5 again acts as a control circuit. In this embodiment, the control criterion is the voltage drop at the constant current source, which is regulated with the goal of a minimal voltage drop. When the circuits described here are provided with a bypass circuit, a higher on-board system voltage can be tapped from the bus system than would be the case without the bypass circuit. The advantages of a higher on-board system voltage are well known.

Figure 8:
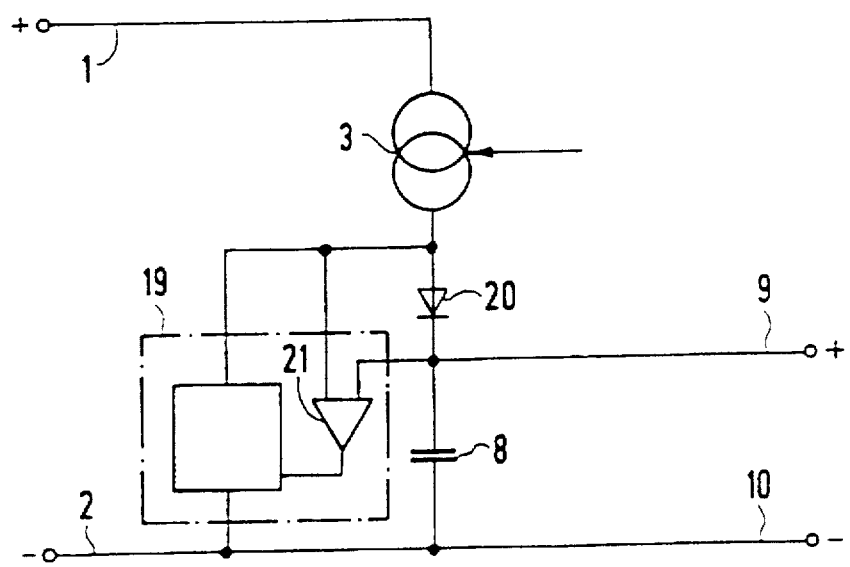
FIG. 8 shows a constant current source with a bypass and the triggering for it.

The arrangement provided with the bypass circuit 19 according to FIG. 8 is triggered by a comparator 21. The circuit according to FIG. 8 is supplemented by adding a triggering circuit 5 according to one of FIGS. 1 to 3 and according to FIG. 6, for example.

Figure 9:
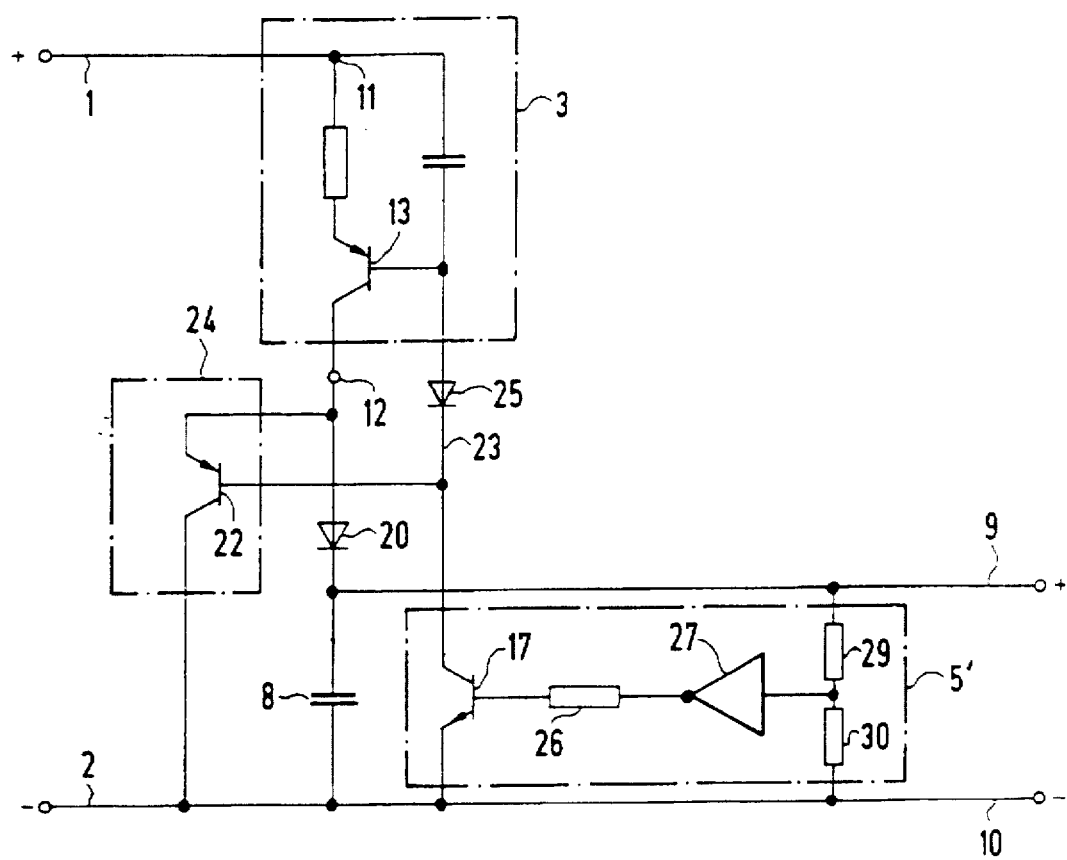
FIG. 9 shows an improvement on the device according to FIG. 2, with a bypass provided on the basis of an especially advantageous embodiment.

The circuit according to FIG. 9 illustrates a circuit principle whereby the circuit according to FIG. 2 is provided with a bypass function and is suitable specifically for integration into an integrated circuit. In this case, a comparator 21 according to FIG. 8 is not necessary for triggering the bypass function. The bypass circuit is designed as a bypass 24 having a transistor 22 whose base is connected to a control line 23 between a triggering circuit 5' and the coupling circuit 3. An element 25 that produces a voltage drop, in particular a diode connected in the forward conducting direction, is wired between the base of transistor 13 of the coupling circuit 3 and the base of transistor 22 of the bypass 24. The voltage drop at element 25 that produces the voltage drop assures that the current of coupling circuit 3 will charge the reservoir capacitor 8 in the operating phase as a constant current source as long as the voltage at reservoir capacitor 8 and thus the on-board system voltage at power supply rails 9 and 10 is lower than the voltage between the bus drivers 1 and 2. For operating states where the voltage at reservoir capacitor 8 is higher than that between the bus drivers 1 and 2, the voltage at element 25 that produces the voltage drop assures that the transistor 22 of bypass 24 is switched to be conducting and thus a constant current can continue to flow.

A resistor 26 and an inverting amplifier 27 are connected in series in triggering circuit 5' to the base of the transistor 17. The input of inverting amplifier 27 is connected between two voltage-splitting resistors 29 and 30 coupled between the power supply rails 9 and 10. If the on-board system voltage between the power supply rails 9 and 10 is lower, the input of the inverting amplifier 27 in this embodiment assumes a more negative potential, so an amplified positive voltage is available at its output and is available as a positive potential at the base of transistor 17 and causes a smaller current flow over the collector and the emitter so that a more negative potential is available at the base of transistor 13 of the coupling circuit. With a pnp transistor, a higher current is conducted between the emitter and collector, which current charges the reservoir capacitor 8 so that a higher voltage is again available between the power supply rails 9 and 10. The operating phase of the DC source corresponds to the mode of operation described above.

Figure 10:
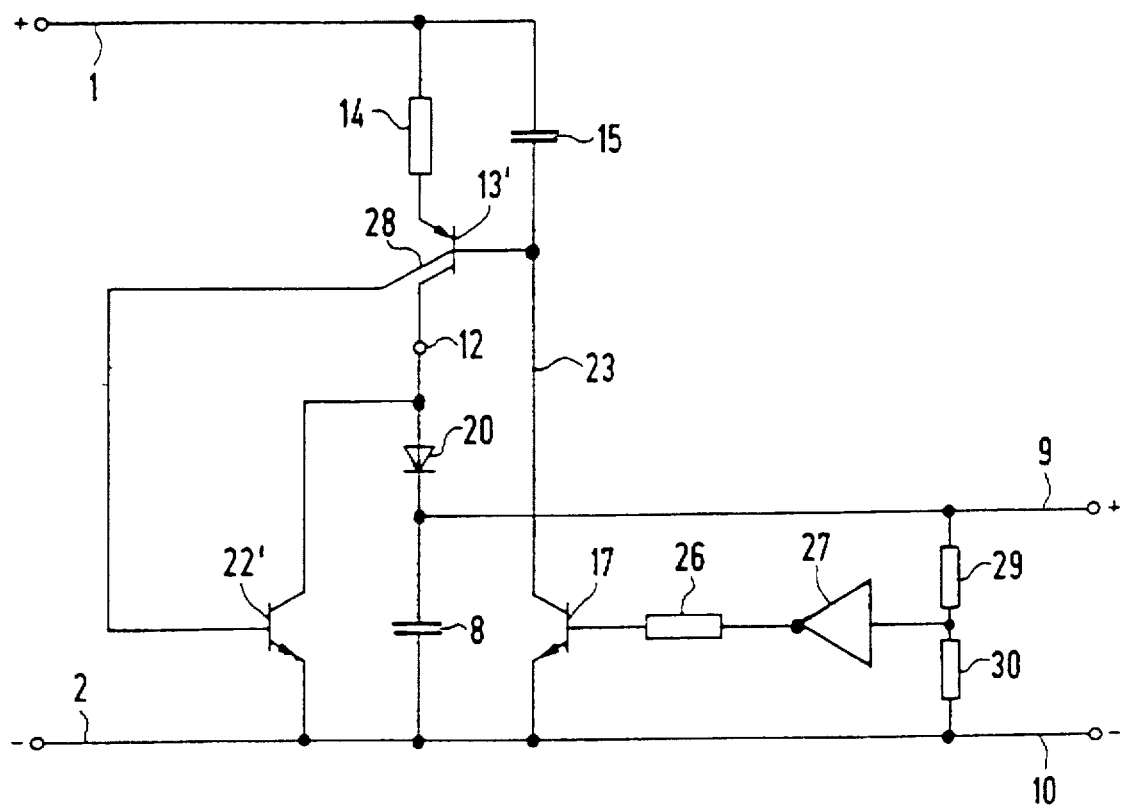
FIG. 10 shows an improvement on the device according to FIG. 2, with the bypass provided on the basis of another especially advantageous embodiment.

FIG. 10 illustrates a further embodiment in which the comparator 21 in the embodiment of FIG. 8 is also superfluous. In comparison to the embodiment of FIG. 9, no element 25 to produce the voltage drop is necessary here, and the transistor 22 for the bypass function is triggered by a transistor 13' of the coupling circuit 3 that is implemented with a sensing collector 28. The design of a transistor with a sensing collector is described in German Patent No. A 4,316,608. Such a transistor has another collector, the sensing collector that recognizes the start of saturation as dropping below a voltage difference. If such a transistor is triggered at its base with a constant current, i.e., the coupling circuit is operated as a constant current source, a current flows from the emitter to the sensing collector and, as long as the transistor is not in the saturation range, the sensing collector remains currentless. When the transistor is in saturation with regard to the main collector, the sensing collector receives excess holes, so to speak, from a physical standpoint. The transistor formed with the sensing collector is in saturation when the emitter-collector voltage is very low. Therefore, the current flowing in the sensing collector is an indication that there is also a low voltage difference between the collector and the emitter. The saturation state generally has the effect that a further increase in control current cannot cause an increase in collector current.

In the embodiment of FIG. 10, the coupling circuit includes the capacitor 15, the resistor 14 and the transistor 13' with sensing collector 28. Transistor 13' with collector 28 also serves to trigger transistor 22 for the bypass function. Again, a directional blocking valve 20 prevents a charge from flowing out of the reservoir capacitor 8. In comparison with the circuit according to FIG. 9, the functions of element 25 that produces the voltage drop are carried out by transistor 13' with sensing collector 28. Otherwise, the same components as in the device according to FIG. 9 are labeled with the same reference numbers. In the circuit according to FIG. 10, when the coupling circuit is operated as a constant current source and the voltage collapses between the emitter and collector of the transistor 13' due to the drop in bus voltage in comparison with the on-board system voltage between the power supply rails 9 and 10, current is drawn from the sensing collector 28 because of the incipient saturation state. This causes transistor 22' to become conductive, so the condition for the operating state as a constant current source is assured. Transistor 22' according to FIG. 10 differs from transistor 22 according to FIG. 9 only in its doping as a PNP transistor or as an NPN transistor.

A smooth transition between an operating phase with a constant current source and an operating phase in the control circuit function is essential to the present invention. The constant current source is used for high frequencies such as those used for communications, and the operating phase as a control circuit is for low frequencies that occur due to current drain in the on-board system. It is essential that circuits that are especially favorable for integration into an integrated circuit can be implemented according to the principles of the present invention. The discrete components illustrated here can also be effectively implemented in an integrated circuit in a known manner. The circuit connections can of course be implemented in integrated circuit technology. Designing the circuits according to FIGS. 9 and 10 as integrated circuits permits savings of materials. In addition, the bipolar transistors can be replaced by field effect transistors.

I claim:

1. A device for supplying an on-board system voltage in a bus coupler without a repeater for coupling to an information and power carrying bus of a bus system, the device comprising:

a triggering circuit having inputs for a control criterion;

a coupling circuit having a control input connected to the triggering circuit, wherein at communications frequencies the coupling circuit operates as a constant current source and wherein at lower frequencies the coupling circuit operates as a control circuit in combination with the triggering circuit, the coupling circuit including:
a transistor with an emitter coupled to
a first terminal of the coupling circuit, a collector coupled to a second terminal of the coupling circuit and a base coupled to said control input of the coupling circuit, and
a capacitor connected between the first terminal and the control input of the coupling circuit; and a reservoir capacitor for tapping the on-board system voltage effectively coupled in series with the coupling circuit, wherein the series combination of the reservoir capacitor and the coupling circuit is effectively connected to the bus.

2. The device of claim 1, wherein the inputs of the triggering circuit are connected to the first and second terminals of the coupling circuit and wherein the triggering circuit causes a voltage drop of the coupling circuit to be minimized.

3. The device of claim 1, wherein the inputs of the triggering circuit are connected across the reservoir capacitor and wherein the triggering circuit causes the on-board system voltage to be kept substantially constant.

4. The device of claim 1 comprising:

a directional blocking valve connected in series with the coupling circuit and the reservoir capacitor; and a bypass circuit connected in series with the coupling circuit and across the series combination of the reservoir capacitor and the directional blocking valve, wherein the directional blocking valve is in a blocking state when a voltage at the reservoir capacitor is higher than a voltage at the bypass circuit, and the directional blocking valve is in a conducting state when the voltage at the reservoir capacitor is lower than the voltage at the bypass circuit, and wherein the bypass circuit blocks current when a bus voltage is higher than the on-board system voltage and conducts current when the bus voltage is lower than the on-board system voltage.

5. The device of claim 4, wherein the bypass circuit includes a transistor having a base which is connected to the control input of the coupling circuit via a diode connected in a forward conducting direction.

6. The device of claim 1 comprising:

a directional blocking valve connected in series with the coupling circuit and the reservoir capacitor; and a bypass circuit connected in series with the coupling circuit and across the series combination of the reservoir capacitor and the directional blocking valve, the bypass circuit including a transistor of a complementary type, wherein the transistor of the coupling circuit includes a sensing collector, the sensing collector being connected to a control input of the bypass circuit.

* * * * *